(12) United States Patent
Pohlen

(10) Patent No.: US 11,953,713 B2
(45) Date of Patent: Apr. 9, 2024

(54) GLAZING HAVING LIGHTING CAPABILITIES

(71) Applicant: ACR II GLASS AMERICA INC., Nashville, TN (US)

(72) Inventor: Markus Walter Pohlen, Muckeln (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 123 days.

(21) Appl. No.: 17/440,982

(22) PCT Filed: Mar. 20, 2020

(86) PCT No.: PCT/EP2020/057751
§ 371 (c)(1),
(2) Date: Sep. 20, 2021

(87) PCT Pub. No.: WO2020/188078
PCT Pub. Date: Sep. 24, 2020

(65) Prior Publication Data
US 2022/0171116 A1  Jun. 2, 2022

Related U.S. Application Data

(60) Provisional application No. 62/821,714, filed on Mar. 21, 2019, provisional application No. 62/821,735, filed on Mar. 21, 2019.

(51) Int. Cl.
*F21V 8/00* (2006.01)
*B32B 17/10* (2006.01)
(Continued)

(52) U.S. Cl.
CPC ...... *G02B 6/0043* (2013.01); *B32B 17/10036* (2013.01); *B32B 17/10541* (2013.01);
(Continued)

(58) Field of Classification Search
CPC ........ G02B 6/0043; G02B 6/003; B60Q 3/64; B60Q 3/208; B32B 17/10036;
(Continued)

(56) References Cited

U.S. PATENT DOCUMENTS 9,109,773 B2   8/2015  Massault et al.
9,335,021 B2   5/2016  Massault et al.
(Continued)

FOREIGN PATENT DOCUMENTS

CN   102822007 A   12/2012
DE   19703398 A1   8/1998
(Continued)

OTHER PUBLICATIONS

Search translation of DE 19703398 A1 (Year: 2023).*
(Continued)

*Primary Examiner* — Laura K Tso
(74) *Attorney, Agent, or Firm* — K&L Gates LLP

(57) ABSTRACT

A laminated glazing having a first glass substrate (104) and a second glass substrate (108) and a polymer interlayer (106) laminated between the first glass substrate and the second glass substrate, being formed with a light path (120) formed in any one or combination of the first and second glass substrates and the polymer interlayer for guiding light emitted from a light source (112), a light introduction surface (110) for introducing the light emitted from the light source into the light path, and a light extraction surface (130,150) for extracting, from the light path, the light to either one or both of an interior and an exterior of the first and second glass substrates.

17 Claims, 15 Drawing Sheets

(51) Int. Cl.
*B60Q 3/208* (2017.01)
*B60Q 3/64* (2017.01)

(52) U.S. Cl.
CPC .. *B32B 17/10651* (2013.01); *B32B 17/10669* (2013.01); *B60Q 3/64* (2017.02); *G02B 6/003* (2013.01); *G02B 6/0065* (2013.01); *B32B 2250/03* (2013.01); *B32B 2605/08* (2013.01); *B60Q 3/208* (2017.02)

(58) Field of Classification Search
CPC ........ B32B 17/10541; B32B 17/10651; B32B 17/10669; B32B 2250/03; B32B 2605/08
USPC .......................................................... 362/511
See application file for complete search history.

(56) References Cited

U.S. PATENT DOCUMENTS

| | | | |
|---|---|---|---|
| 9,746,600 | B2 | 8/2017 | Massault et al. |
| 10,105,933 | B2 | 10/2018 | Berard et al. |
| 2007/0098969 | A1 | 5/2007 | Ansems et al. |
| 2015/0177443 | A1 | 6/2015 | Faecke et al. |
| 2015/0298601 | A1 | 10/2015 | Bott et al. |
| 2017/0139109 | A1 | 5/2017 | Gierens et al. |
| 2019/0202177 | A1* | 7/2019 | Manz ................ B32B 17/10761 |

FOREIGN PATENT DOCUMENTS

| | | | |
|---|---|---|---|
| DE | 102012109900 B4 | | 10/2015 |
| EP | 0452815 B1 | | 11/1994 |
| EP | 2219056 A1 | | 8/2010 |
| EP | 2401639 A1 | | 1/2012 |
| FR | 2996504 A1 | | 4/2014 |
| JP | H07126046 A | | 5/1995 |
| JP | H08169258 A | | 7/1996 |
| KR | 20070119017 A | * | 12/2007 |
| WO | 2007077099 A1 | | 7/2007 |
| WO | 2014167291 A1 | | 10/2014 |
| WO | 2017154583 A1 | | 9/2017 |

OTHER PUBLICATIONS

International Search Report for International application No. PCT/EP2020/057751, dated Mar. 20, 2020, dated May 11, 2020, by International Search Authority/EP, 4 pages.

Office Action for related Chinese Application No. 202080022567.2; action dated Sep. 8, 2022; (12 pages).

* cited by examiner

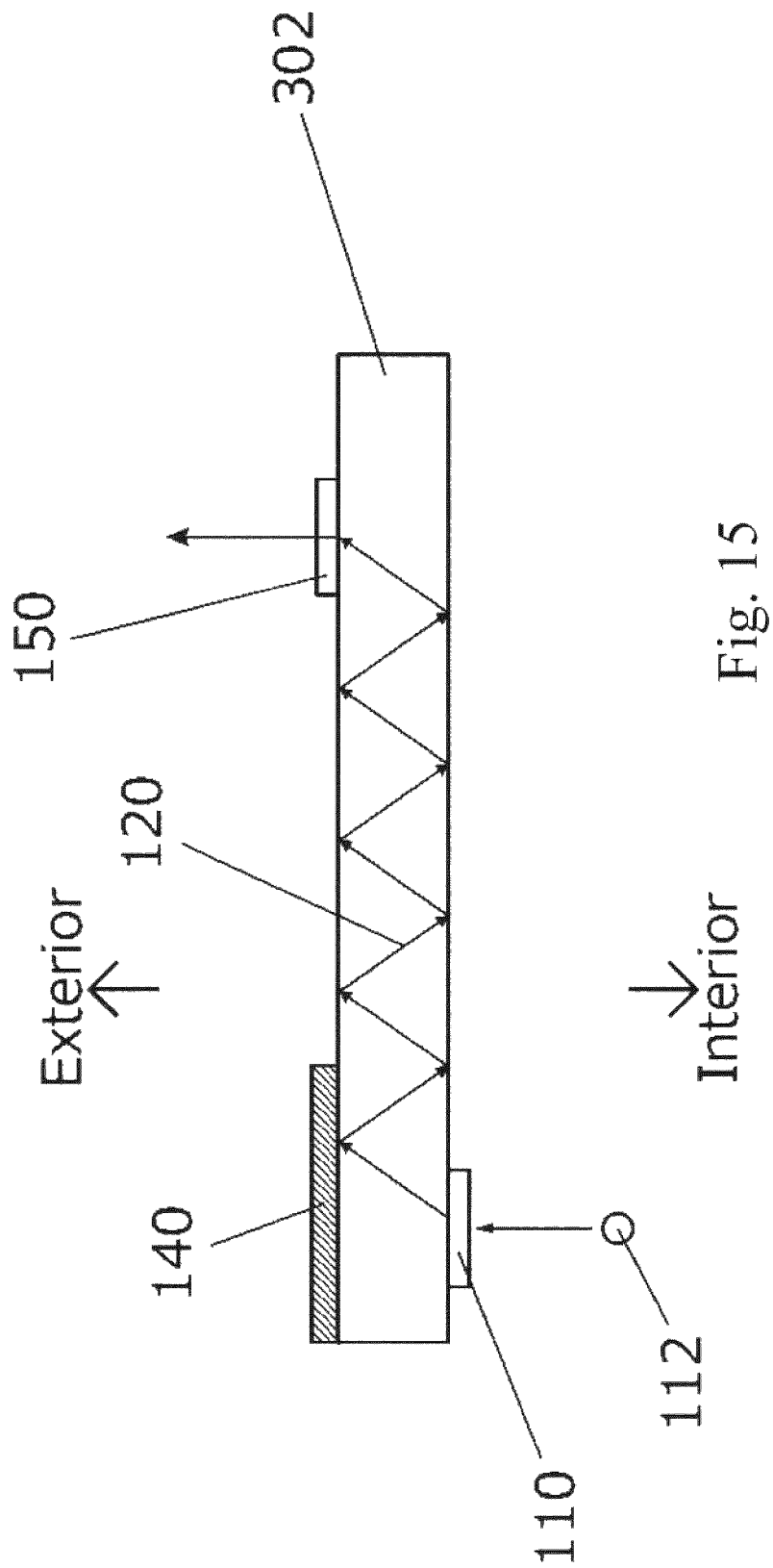

GLAZING HAVING LIGHTING CAPABILITIES

CROSS REFERENCE TO RELATED APPLICATIONS

This application is a national stage of PCT International Application. No. PCT/EP2020/057751, filed Mar. 20, 2020, and claims the priority of U.S. provisional patent application Ser. No. 62/821,714, filed Mar. 21, 2019 and Ser. No. 62/821,735, filed Mar. 21, 2019, both entitled "GLAZING HAVING LIGHTING CAPABILITIES," the entire contents of which are incorporated herein by reference in their entirety.

TECHNICAL FIELD

This disclosure generally relates to a glazing having a lighting capability and, more particularly, to a glazing used for vehicle having a lighting capability.

BACKGROUND OF RELATED ART

Automotive glazings having luminous capability are known in the art, including those taught in EP-A-2401639, EP-A-2219056, US2015/0298601A and US2007/0098969A. Conventional glazing designs have included a light source positioned at an edge portion of glass, and visible light from the light sources is introduced into the glass window to generate luminance at a main surface of the glass window. The luminance may be achieved by visible light scattering at particles such as indium tin oxide and/or titanium oxide in a glass lamination.

SUMMARY OF THE DISCLOSURE

Disclosed herein as one aspect or embodiment of our proposals is a laminated glazing. It comprises a first glass substrate having a first surface and a second surface, a second glass substrate having a third surface and a fourth surface and a polymer interlayer laminated between the first glass substrate and the second glass substrate, contacting the second surface of the first glass substrate and the third surface of the second glass substrate. In one proposal herein a light path is formed in any one or combination of the first and second glass substrates and the polymer interlayer, which provide or constitute a waveguide for guiding light emitted from a light source. The waveguide may guide light along inside the layer, in the plane of the layer, from an introduction position to an extraction position spaced away from the introduction position. The glazing also has a light introduction surface for introducing the light emitted from the light source into the light path; and a light extraction surface for extracting the light from the light path, such as especially from the waveguide thereof, to either one or both of an interior and an exterior of the first and second glass substrates.

Other aspects, preferred features, options and embodiments are set out below and in the appended claims.

One such other aspect applies the proposals in a glazing having a single glass substrate; all the proposals herein are applicable thereto except those specific to laminated substrates.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

FIG. 15 illustrates a glazing having a structure with an opaque printing according to an exemplary aspect of the present disclosure.

DETAILED DESCRIPTION

Figure 1:
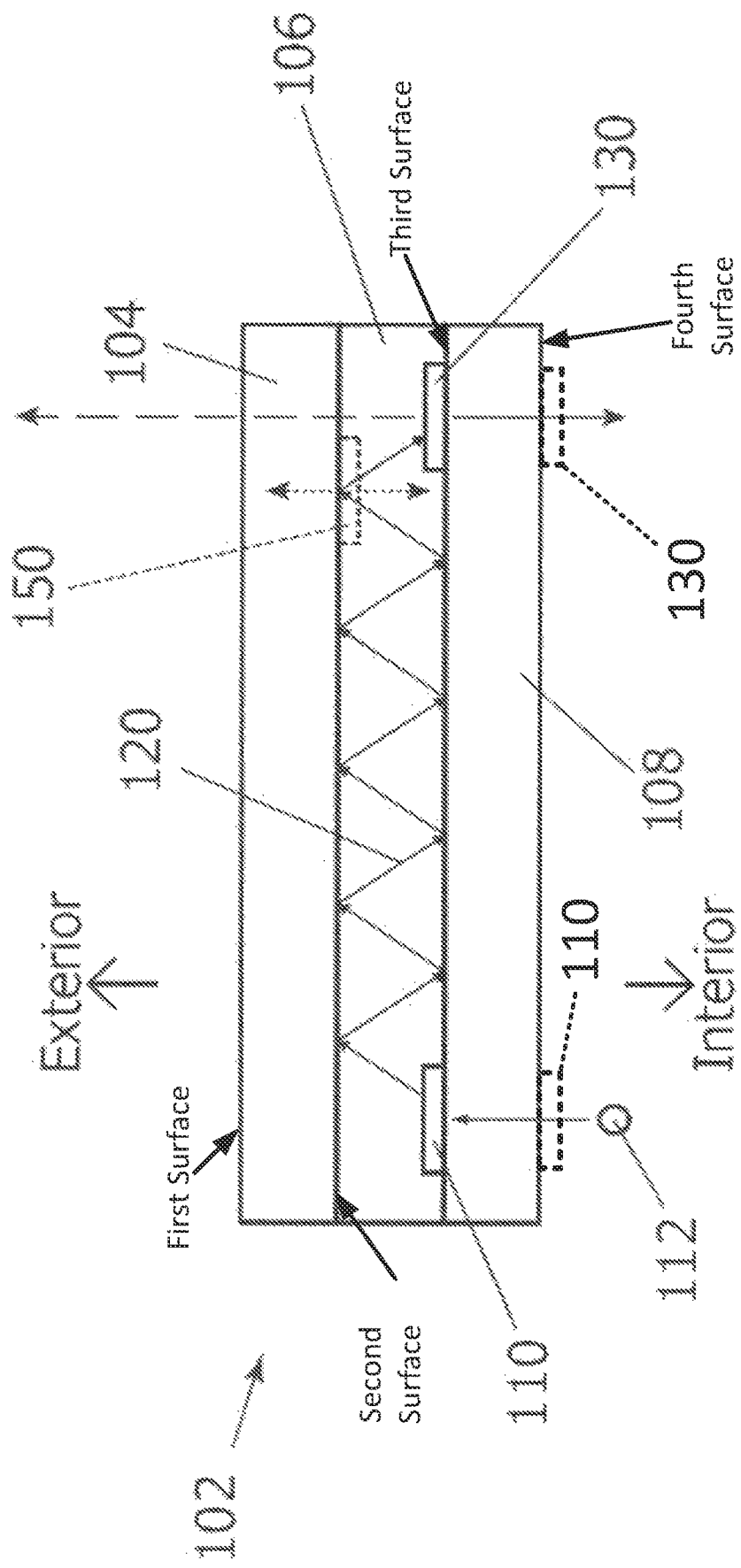
FIG. 1 illustrates a laminated glazing having a structure with a light path formed in a polymer interlayer, according to an exemplary aspect of the present disclosure.

In the following description, for purposes of explanation, specific details are set forth in order to promote a thorough understanding of one or more aspects of the disclosure. It may be evident in some or all instances, however, that any aspects described below can be practiced without adopting the specific design details described below.

Among other features, the present disclosure provides a glazing having a lighting capability. As used herein, the term "S1" may refer to the exterior glass substrate surface in an automotive application. The term "S4" may refer to the interior glass substrate surface of a laminated glass product. "S2" may be a glass substrate surface opposite S1 and "S3" may be a glass substrate surface opposite S4. In a laminated glass product, S2 and S3 may be a part of the laminate interior. S2 may be an interior glass substrate surface in automotive constructions using a single glass sheet, including a tempered glass substrate.

A light may be desired for various functions in a vehicle, including providing ambient light, lighting an interior or an exterior while passengers enter or exit the vehicle, or a reading light. As such, it may be preferable to provide diffused and/or directed light in a vehicle. Diffused light may have less intensity than direct light, as light may be more scattered than direct light sources and may provide an aesthetic appearance. To provide diffused light, scattered light may extend in any direction from a diffuser. Directed light may be preferable in some circumstances, such as, for example, to provide a reading light. A diffused light may also be bright enough to supply enough light for reading or for illuminating an interior or exterior while passengers enter or exit a vehicle. A dim light may be preferable where light provides an aesthetic appearance in a vehicle and may not be required to provide enough light to significantly improve visibility. Exterior lighting may be desired for various functions in a vehicle, including providing signalling, warnings for pedestrians and/or other vehicles, advertising, or brake lights. Exterior lighting is used in vehicle to transmit information to those outside the vehicle. This may include signalling a turn or lane change or a brake light indicating a change in speed. Further warnings may be preferable as autonomous vehicles enter the market. Pedestrians and drivers may not be able to communicate with a driver to convey a situation, including, for example, whether the vehicle will wait for a pedestrian to cross the street.

Glass may be a desirable option to provide lighting to an interior and/or exterior space, including vehicle glass. A vehicle window may provide a large surface useful for various lighting configurations. Particularly, side windows or sunroofs in a vehicle may be used for vehicle lighting systems. Preferably, a sunroof may provide overhead lighting that may be aesthetically pleasing and/or functional lighting. In some embodiments, as disclosed herein, a light source may be directed at a glazing surface. In particular embodiments, the light source is provided at a periphery of a glazing. Where light sources are mounted around a glass periphery, it may be preferable to obscure the light source(s) from view of a vehicle passenger. For example, the light source(s) may be held within a mounting device. It may further be preferable to obscure an exterior view of the light source(s) with an opaque print. In some embodiments, the light source may be mounted with a housing. The light source may, in some embodiments, be attached to a vehicle frame adjacent to a glazing or to the glazing. It may be desirable to provide light to a vehicle at a location away from a glazing periphery, where it may not be desirable to see a light source.

Among other features, disclosed herein are glazings, including automotive glazings, having lighting capabilities where the light is extracted from a glazing at a point separate from where the light source is directed. Light emitted towards a glazing may be redirected to a desired extraction point where the light may be directed into a vehicle in a desired location. In particular embodiments, as described herein, a lighting system may include a light source directed to a glazing surface at a light introduction surface such that the light introduction surface may redirect the light into an optical waveguide to form a light path wherein light is reflected through the waveguide to a light extraction surface. Light may then be emitted into an interior or exterior space, or namely a vehicle interior or exterior, through or reflected from the light extraction surface. Alternatively, light may be emitted to an exterior space, or namely a vehicle exterior, through or reflected from the light extraction surface. In certain embodiments, light may be emitted in both an interior space and an exterior space simultaneously.

In some embodiments, as disclosed herein, a glazing may provide a lighting capability. It may be preferable to introduce ambient lighting to a glazing to provide an aesthetic quality to the glazing and a vehicle in which the glazing is installed. A suitable glazing may include a laminated glazing or a single glass pane. As shown in FIG. 1, the glazing may, in some embodiments, include a laminated glazing 102 having at least two glass substrates 104,108. For example, the laminated glazing 102 may include a first glass substrate 104 and a second glass substrate 108. In an automotive glazing, the first glass substrate 104 may face a vehicle exterior and the second glass substrate 108 may face a vehicle interior. Where the glazing 102 is meant for automotive use, flat glass substrates 104,108 may be bent at thermal bending process temperatures (e.g., greater than 580° C. for soda-lime glass, which may be defined by ISO 16293-1:2008) to obtain a required three-dimensional shape, which may include cylindrical or spherical shapes, to be fit for a vehicle's window. The glass substrate may be formed of an inorganic glass such as soda-lime glass, and further may be formed of an organic glass such as acrylic glass and polycarbonate glass. Opaque enamel printings may be printed by, for example, screen-printing on one or both of the flat glass substrates 104,108 before thermal bending. The screen-printed opaque printings may be fired from 500° C. to 700° C. during the thermal bending process to form a rigid print with high mechanical durability on the glass substrate(s). Glass bending may preferably occur from 560° C. to 700° C., more preferably from 580° C. to 650° C. A polymer interlayer 106, which may include any suitable laminating material, including polyvinyl butyral ("PVB"), ethylene vinyl acetate ("EVA"), or ionomer materials, may be used for laminating glass substrates 104,108 together. The lamination process may include autoclaving a stack, including the glass substrates 104,108 and the polymer interlayer 106, at a particular temperature and pressure (such as 110° C. to 160° C. and 10 to 16 bar) to bond the glass substrates 104,108 together. The method may be used to prepare various laminated glass products, including windshields, sunroofs, side windows, partition walls, and back windows.

A single glass pane may include a tempered glass substrate, which may be bent during a thermal bending/tempering process, as described herein, and cooled to temper or thermally strengthen (heat-strengthened) the glass. In some embodiments, a glass substrate may be chemically strengthened. Tempered glass may be used to provide various glass products in a vehicle, including side windows, back windows, and pillar panels. The lighting capabilities described herein may preferably be formed with a glass substrate, a laminated glazing, or a layer of a laminated glazing.

The glazing 102 may have a suitable surface to provide light to a vehicle interior or exterior. The glazing may preferably include a light source 112 and a light extraction surface 130 where light may be transmitted from the glazing 102 towards an interior or exterior space. In certain embodiments, the light source 112 may be a source external to the glazing 102. For example, as shown in FIG. 1, the light source 112 may be adjacent to the glazing 102, such that light from the light source 112 is directed towards a side or surface of the glazing 102. Preferably, the light emitted from the light source 112 may be directed into the glazing 102 from a surface of the glazing 102, including S1, S2, or S4.

The light source 112 may direct light at any suitable angle into the glazing 102, including perpendicular to a glazing major surface. The light source 112 may be any suitable material, including light emitting diodes (LEDs) or laser light sources. Embodiments described herein may include any number of light sources 112. Each light source 112 may be directed in the same or different directions towards a glazing 102. The orientation of the light source(s) 112 may depend on the lighting system configuration and necessary redirection of light to guide the light to an extraction surface 130, where the light may be introduced to either or both of a vehicle interior and a vehicle exterior. The glazing 102 may further be formed with another extraction surface 150 arranged between the first glass substrate 104 and the polymer interlayer 106 for guiding the light to be introduced to either or both of a vehicle interior and a vehicle exterior. The additional extraction surface 150 may be on the same or a different surface than the light extraction surface 130. The light source 112 may be attached to or near the glazing by any suitable means. The light source 112 may, in some embodiments, be incorporated into the window frame or vehicle body where the window is mounted. Preferably, the light source or sources 112 are located at a peripheral portion of the glazing 102, such that they may not be visible to a passenger or driver of a vehicle.

Figure 2:
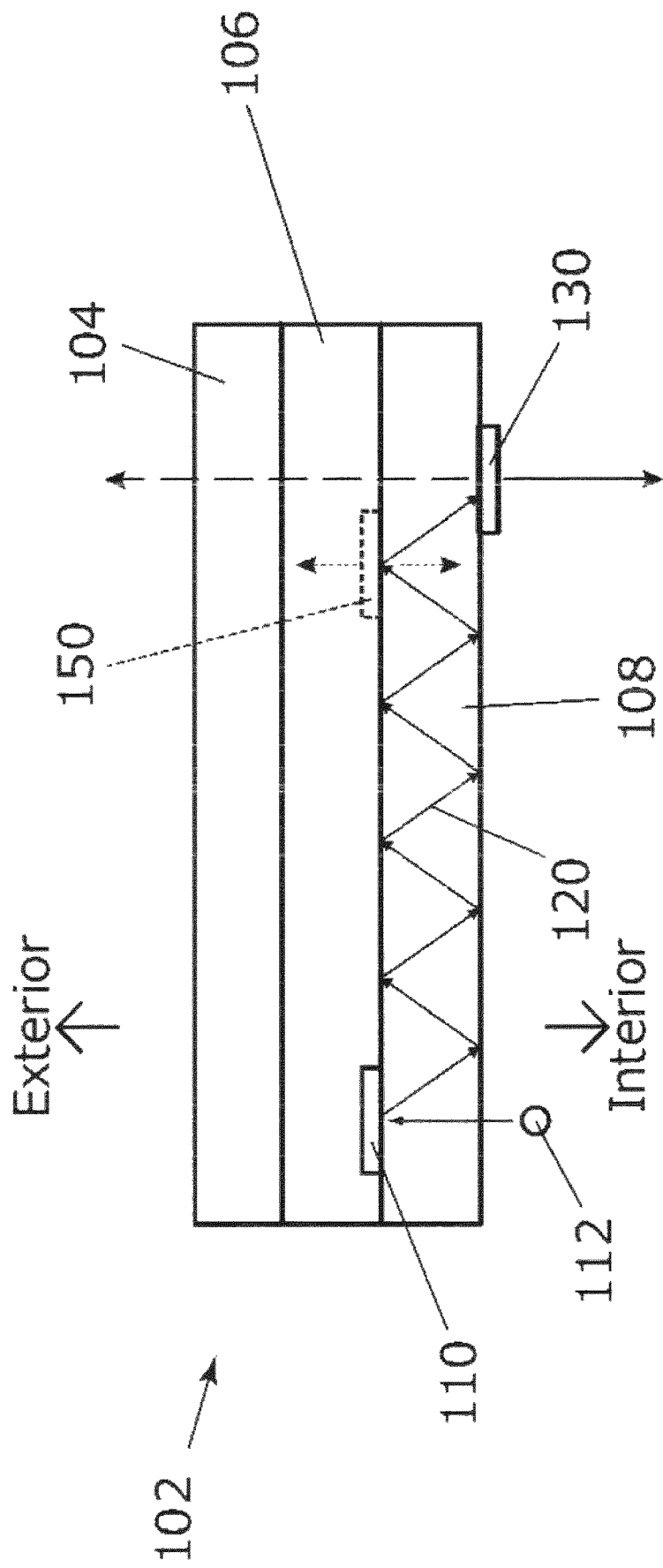
FIG. 2 illustrates a laminated glazing having a structure with a light path formed in a glass substrate, according to an exemplary aspect of the present disclosure.

As shown in FIGS. 1, 2, where light emitted from the light source 112 is directed into the glazing 102, it may be reflected within the second glass substrate 108 or between glazing substrates 104,108 to a light extraction point or light extraction surface 130 where the light may be extracted from the glazing 102. The light extraction surface 130 may be arranged on a vehicle interior side of the glass substrate 108 or layer 106 forming the light path 120. As described below, the light extraction surface 130 may be a fluorescent material or may include a holographic film to extract the light from the light path. The light extraction surface 130 may be capable of extracting the light toward the vehicle interior as well as the vehicle exterior depending on the illumination design around the glazing 102.

The glazing 102 may be formed with a light extraction surface 150 where the light may be extracted from the glazing 102. The glazing 102 may be formed with either or both of the light extraction surfaces 130,150. The light extraction surface 150 may be arranged on a vehicle exterior side of the glass substrate 108 or layer 106 forming the light path 120. As with the light extraction surface 130, the light extraction surface 150 may be a fluorescent material or may include a holographic film to extract the light from the light path 120. The light extraction surface 150 may be capable of extracting the light toward the vehicle interior as well as the vehicle exterior depending on the illumination design around the glazing 102.

Figure 3:
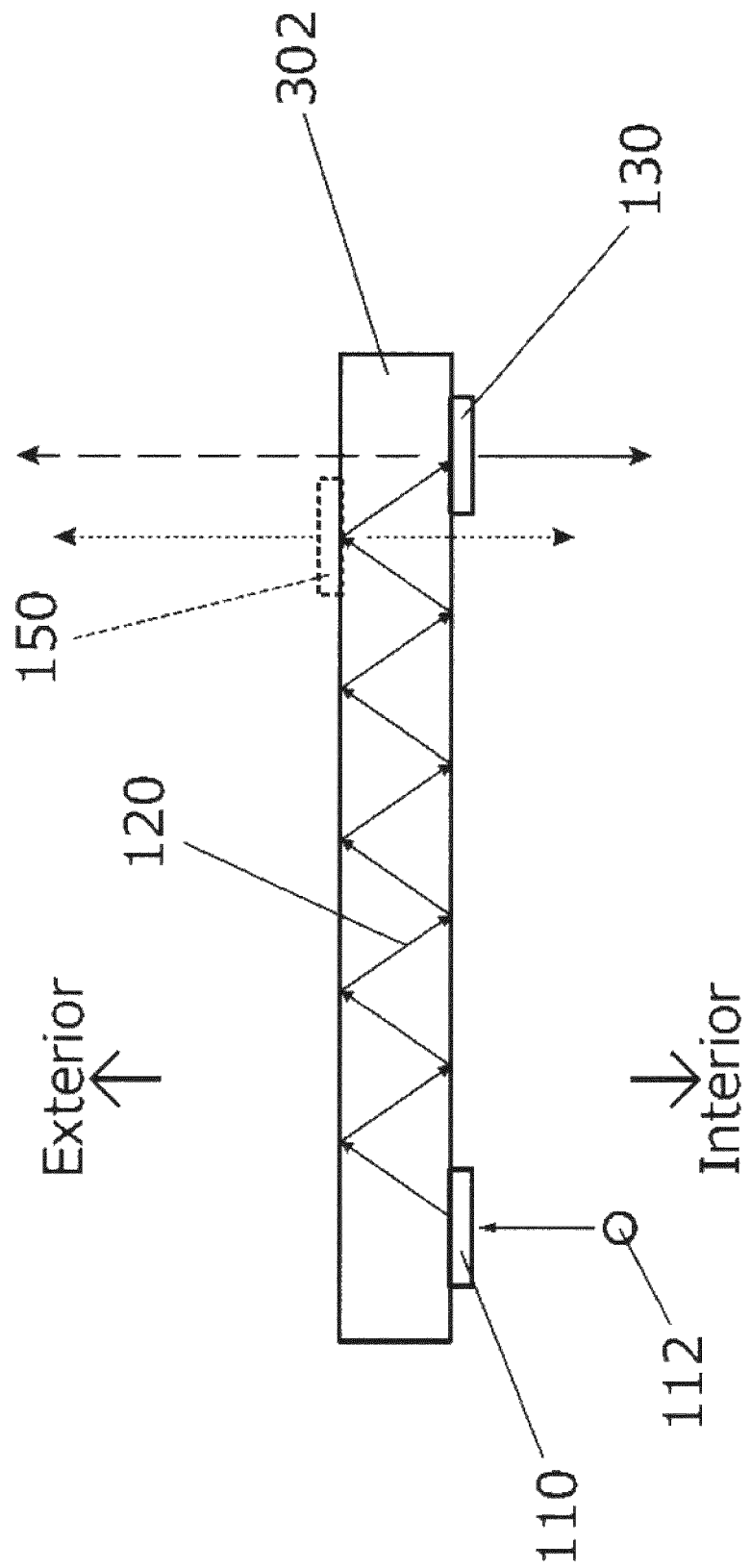
FIG. 3 illustrates a glazing having a structure with a light path formed in the glazing, according to an exemplary aspect of the present disclosure.

Further, FIG. 3 illustrates a single glass substrate 302, which may be tempered, as a waveguide between a light source 112 and a light extraction surface 130. Preferably, the light may be directed into the glazing 102 at a light introduction surface 110 which may redirect the light to reflect 120 within the waveguide. Preferably, the light introduction surface 110 may be provided on the interior surface S2 of a non-laminated glass substrate 302.

Where the light introduction surface 110 is on a glass surface within a lamination, the construction may include an adhesive layer, which may include a polymer, between the light introduction surface 110 and the glass surface. The light introduction surface 110 may include any suitable material, including a holographic film layer. The light introduction surface 110 may include a holographic optical element with interference patterns embedded onto a thin, transparent photopolymer or other photosensitive film. Preferably, the light introduction surface 110 may direct the light at an angle which allows the light to be substantially, or totally, reflected light in the light path 120 serving as a waveguide. In some embodiments, it may be preferable that the light introduction surface 110 include a volumetric holographic film. In certain embodiments, the light introduction surface 110 may be a surface holographic film. The angle of the light path 120 within the waveguide may preferably be controlled by the light introduction surface 110 to lead the light to a light extraction surface 130,150. Thus, a light introduction surface herein may comprise a light-redirecting element such as of a kind described herein. It can be provided at a local region to receive light from the source, and adapted to allow light into the glazing layer(s) and the waveguide provided thereby, directed or redirected at an angle appropriate for transmission in-layer in the waveguide.

It may be preferable to include the light introduction surface 110 at a periphery of the glazing where light may be directed to the introduction surface 110 and where the light sources 112 may be housed. The light introduction surface 110 may, in some embodiments, be located behind an opaque enamel print when viewed from outside a vehicle. As shown in FIG. 15, a vehicular glazing may include an opaque printing 140 on a surface of a glass substrate 302 opposite to a light introduction surface 110, such that viewers, including pedestrians, may not see the light introduction surface 110 and the light source 112 from the vehicle exterior side.

The waveguide for forming the light path 120 may be any suitable material in the glazing. For example, the waveguide may include any one or combination of the glass substrates 104,108,302 and, in a laminated glazing, the polymer interlayer 106 between glass substrates 104,108. Further embodiments may include an entire laminated glazing 102 as a waveguide, such that the waveguide includes each glass substrate 104,108 and an interlayer 106 therebetween. The waveguide may function to allow substantially reflected light within the waveguide. In some embodiments, the light may be totally reflected within the waveguide. The refractive index of the materials of a glazing 102,302 and a surrounding environment may allow for a waveguide due to relative changes in refractive indices. Preferably, the waveguide material has a higher refractive index than the adjacent material on either side of the waveguide material, such that reflectivity is achieved on either side of the waveguide and light may reflect therein. Total internal reflection may be possible where the light is redirected by the light introduction surface 110 at an angle larger than a critical angle, with respect to the normal angle to the waveguide surface. The light wave may not pass through the bounds of the waveguide where the waveguide has a higher refractive index than its surroundings and the reflective angle is greater than a critical angle. The light's angle is greater as it moves towards parallel with the waveguide borders. The critical angle may depend on the waveguide and surrounding materials, including their refractive indices. Particularly, the critical angle, $\theta_C$, may be defined by equation (I):

$$\theta_C = \arcsin\left(\frac{n_2}{n_1}\right) \tag{I}$$

wherein $\theta_C$ is the critical angle, $n_2$ is the refractive index of the material surrounding the waveguide, and $n_1$ is the refractive index of the waveguide. In some embodiments, the light introduction surface 110 may be formed to angle the light in a waveguide at an angle greater than a critical angle based on the waveguide material and its surroundings. Further, the angle of the light source 112 and the introduction surface 110 may combine to provide an angle of light greater than the critical angle. As the difference in refractive index increases, the possible angles of total internal reflection also increase.

Figure 4:
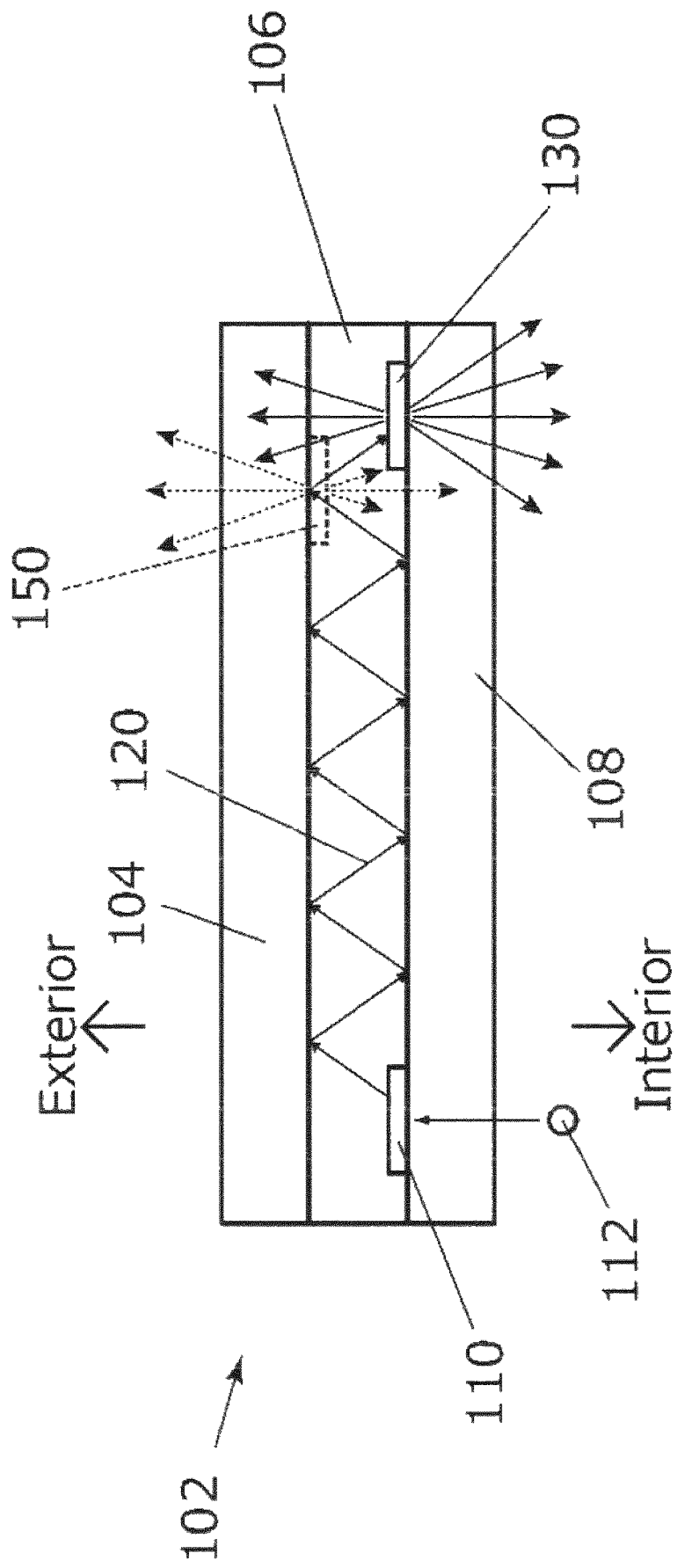
FIG. 4 illustrates a laminated glazing having a structure with a diffusing light extraction surface and a light path formed in a polymer interlayer, according to an exemplary aspect of the present disclosure.
Figure 5:
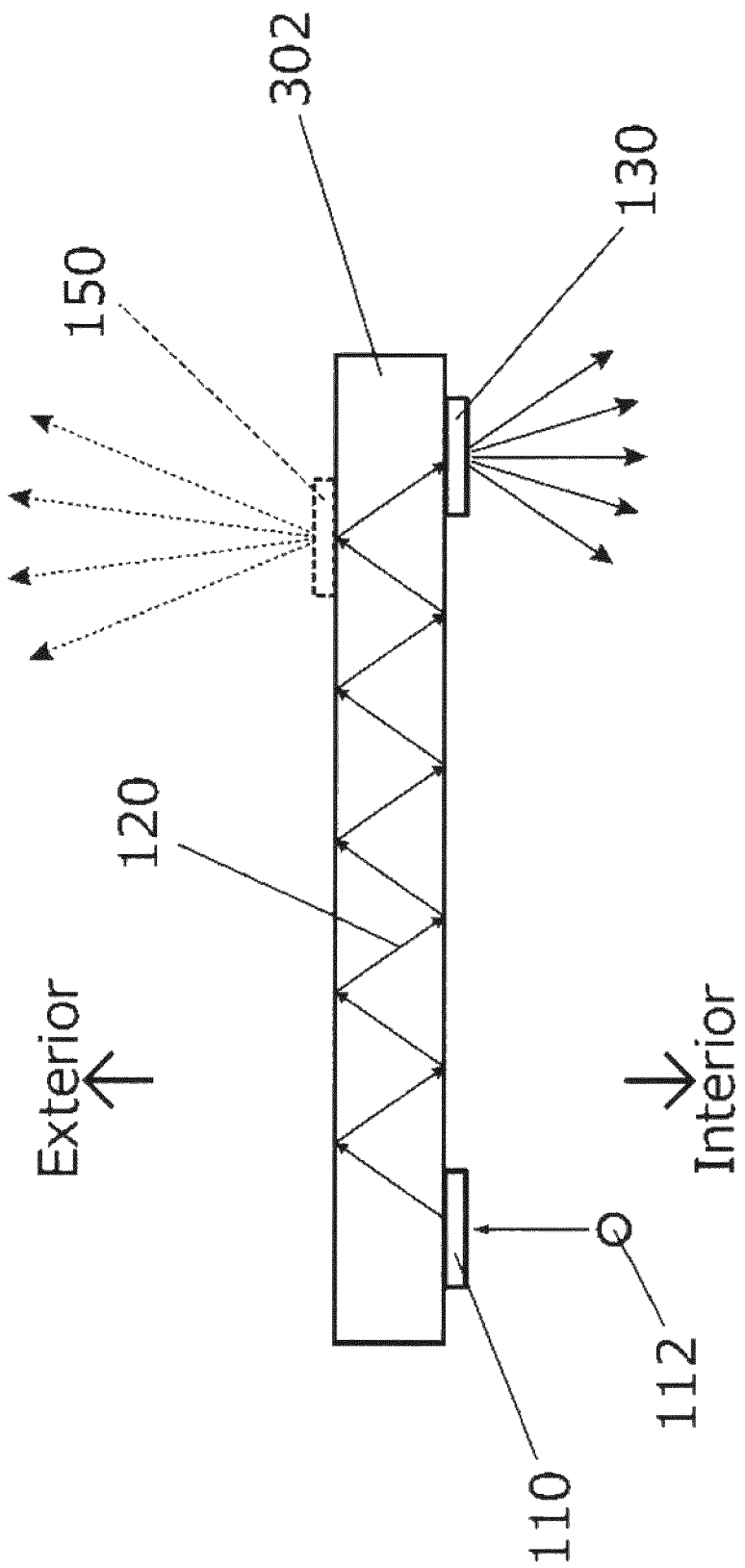
FIG. 5 illustrates a glazing having a structure with a diffusing light extraction surface and a light path formed in the glazing, according to an exemplary aspect of the present disclosure.

A waveguide having total or substantial reflectivity may continue to reflect light within the waveguide, thus, a light extraction surface 130,150 may be necessary to provide light to outside the glazing 102,302 and the waveguide. A light extraction surface 130,150 may be provided on any suitable surface, such that light may be reflected to the light extraction surface 130,150 in a waveguide and emitted outside the waveguide. Preferably, the light extraction surface 130 may be provided on any of the S1, S2, S3, or S4 surfaces in a laminated glazing 102 or the S1 or S2 surface of a non-laminated glass substrate 302. Where the light extraction surface 130,150 is on a glass surface, the construction may include an adhesive layer, which may include a polymer, between the light extraction surface 130,150 and the glass surface. The light extraction surface 130,150 may be configured to provide direct or diffused light. FIGS. 1 to 3 illustrate a direct light extraction, while FIGS. 4 and 5 illustrate a diffuse light extraction. Either a direct or diffuse light extraction is embodied herein, which may be realized based on light diffraction by scattering or by a hologram element. The figures shown are not limiting as to whether a construction may provide direct or diffuse light.

Figure 6:
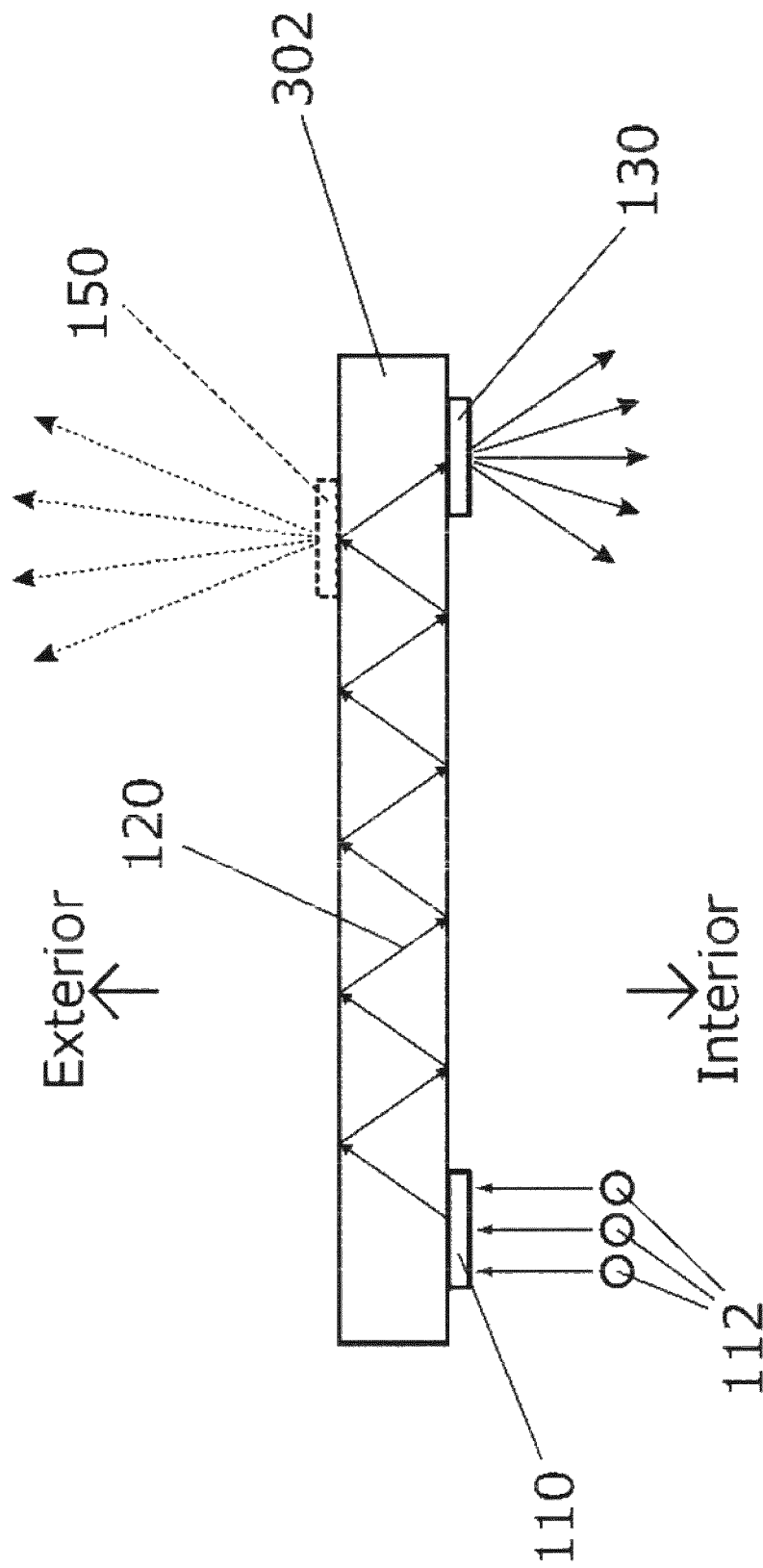
FIG. 6 illustrates a glazing having a structure with a diffusing light extraction surface and multiple light sources, according to an exemplary aspect of the present disclosure.
Figure 7:
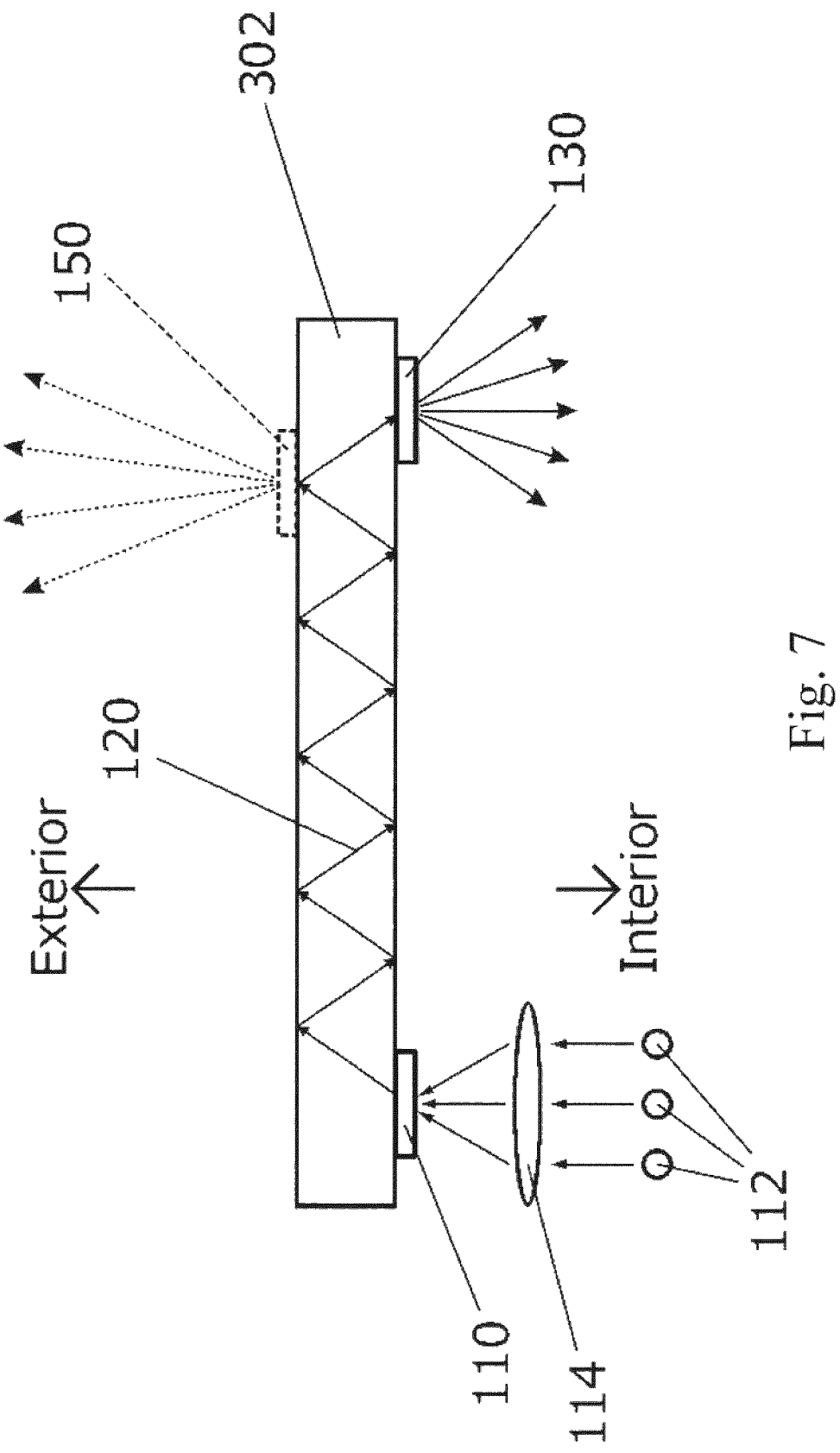
FIG. 7 illustrates a glazing having a structure with a diffusing light extraction surface and an optical element, according to an exemplary aspect of the present disclosure.
Figure 8:
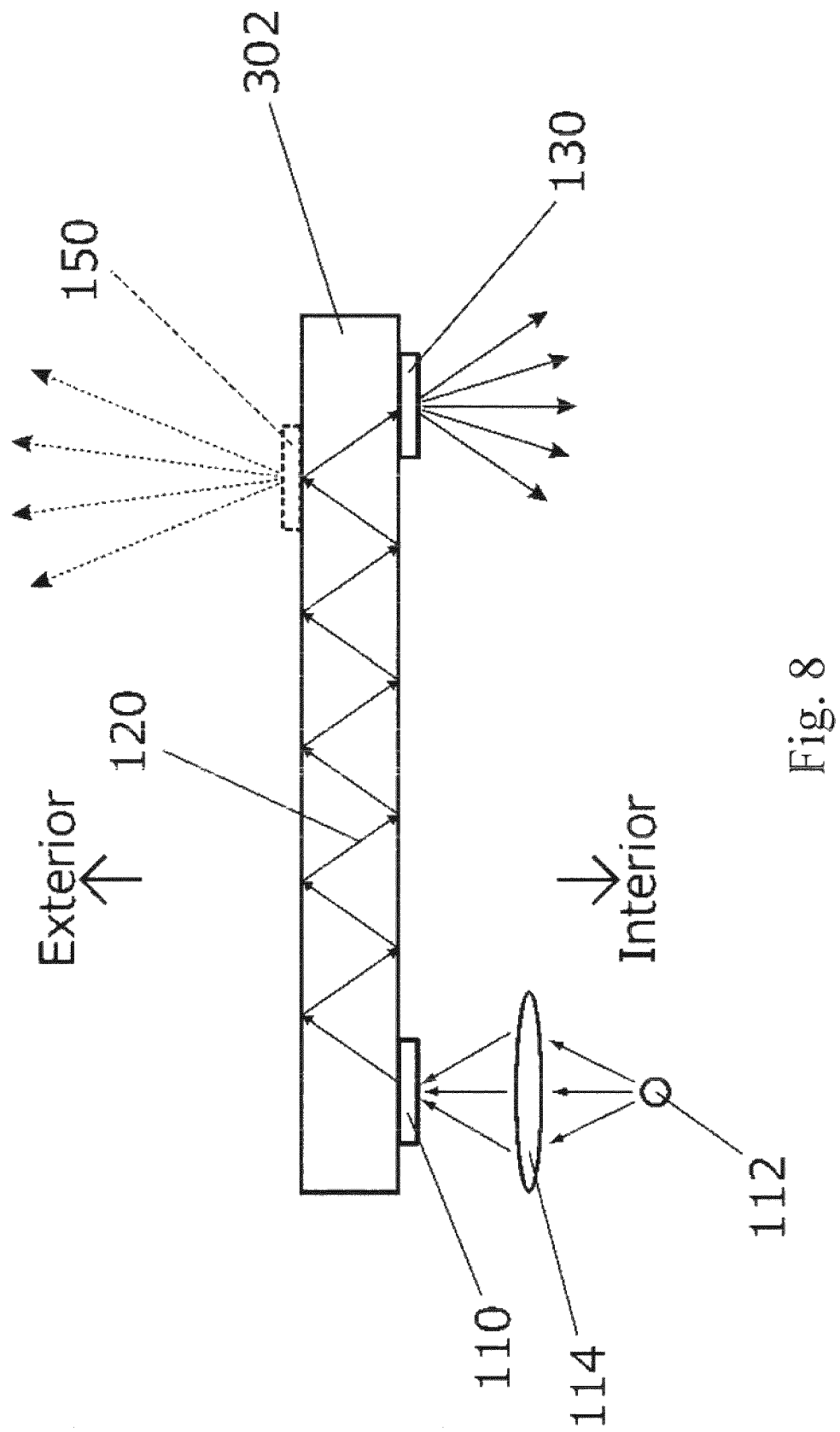
FIG. 8 illustrates a glazing having a structure with an optical element and a single light source, according to an exemplary aspect of the present disclosure.

Multiple light sources 112 may be employed to direct light to the light introduction surface 110 as shown in FIG. 6. As shown in FIG. 7, where multiple light sources 112 are directed to a light introduction surface 110, an optical element 114, such as a lens, may be used to direct the light from multiple sources 112 to the introduction surface 110. In FIG. 7, three light sources 112 are shown for this illustration purpose, however the number of the light sources can be set to any number suitable for this glazing system. The light sources may emit light having the same or different wavelengths. For example, the light emitted may be a combination of red, green and blue LEDs or lasers yielding white light as a combination of light wavelengths. The lens 114 may further be formed to converge the light of multiple light sources 112 or to focus diffuse light of one or more light sources 112, as shown in FIG. 8. An optical element 114 may have any suitable shape, such as convex, concave, spherical or aspherical lenses for light collection. Preferably, the light extraction surface 130,150 is transparent where no light is applied thereto.

Further, the light extraction surface 130,150 may cover any portion of the glazing 102,302 and may be provided in any suitable shape. The desired amount of light extraction or location of light extraction may contribute to the location and size of the extraction surface 130,150.

In certain embodiments, it may be desirable to provide multiple light sources 112 adjacent to a glazing 102,302. Where multiple light sources 112 exist, as shown in FIG. 6, the light sources 112 may be directed to the same or different light introduction surface(s) 110. Further, each light source 112 may include a distinct light path 120 through the waveguide. The light paths 120 may converge or remain separate; however, each light path 120 may be preferably directed to a light extraction surface 130,150 such that light may be extracted at a point separate from the originating light source 112 and the light introduction surface 110. Where the light paths 120 of the multiple light sources 112 converge or reach the same extraction surface 130,150, the light extracted from the waveguide may be stronger than light from a single light source 112. In some embodiments, the light extraction surface 130,150 may have a saturation point where additional light may not further increase light output through the extraction surface 130,150.

The light introduction surface 110 may be formed to direct light through the waveguide in a preferable direction, preferably towards a light extraction surface 130,150. In some embodiments, multiple light sources 112 may be used and the light sources 112 may be located apart from one another adjacent to the glazing 102,302. The separated light sources 112 may be directed to the same or different light introduction surfaces 110 and may be directed through a waveguide to the same or different light extraction surfaces 130,150. Thus, a single glazing 102,302 may include one or more light extraction surfaces 130,150. Preferably, the light extraction surface 130,150 may not be opaque and may preferably have low haze. The light extraction surface 130,150 may be configured such that light passes through the light extraction surface 130,150 or light may be reflected from the light extraction surface 130,150 such that the light is not reflected at an angle greater than the critical angle and light may exit the waveguide.

The light extraction surface 130,150 may be or comprise any suitable light adjusting material or wavelength converter material. In certain embodiments, the light adjusting material may be a fluorescent, phosphorescent, or holographic film. In some embodiments, the extraction surface may include the light adjusting material as a film. A film may, in some embodiments, include a thin film coating on a glass surface or a polymer film. In further embodiments, the light adjusting material may be provided in a matrix or other base material. Particularly, where the light adjusting material is provided as a material including particles or dyes, it may be provided in a matrix or base material.

A fluorescent or phosphorescent film may accept a light from the waveguide for forming a light path, wherein the light may excite the film or a fluorescent or phosphorescent ink layer to provide a lighted surface. For example, a fluorescent extraction surface 130,150 may provide a homogenous lighted surface with a sufficient amount of light from the waveguide. A fluorescent extraction surface 130,150 may be formed by any suitable means, including a fluorescent ink layer applied to a film or a glass surface or by fluorescent particles or dyes in a film. Fluorescent materials may be any suitable materials, including particles, inks, or dyes. A fluorescent ink layer may be printed by any suitable printing, such as inkjet print and screen-print, onto a glass surface in or on a glazing or on a film which may be laminated in or adhered to a glazing. An extraction surface 130 made of a fluorescent material may include any suitable material, including phosphor materials. Phosphor materials may include particles, which may preferably be from 0.5 to 15 μm in size, more preferably from 1 to 12 μm, and even more preferably from 1 to 10 μm. The refractive index of fluorescent particles may be higher than a waveguide which may cause a hazy appearance. In some embodiments, fluorescent materials, including particles, may be encapsulated in a high refractive index matrix material, which may have an index of refraction matching or substantially matching the fluorescent materials. For example, fluorescent particles may have a refractive index of 1.8-2.0 and a typical encapsulation material may have a refractive index of 1.4-1.6.

High refractive index polymers or high refractive index nano-composites may be used in some embodiments to encapsulate the fluorescent materials as the refractive index of the encapsulation materials may be closer to or the same as the fluorescent materials. Haze may be reduced where the index of refraction is matched or changes in index or refraction are minimized.

An extraction surface 130,150 made of a fluorescent material may be excited to provide a lighted surface. The lighted surface may be used for ambient lighting and may be strong enough to provide reading light. The extraction surface may be any suitable shape such that a lighted design may be provided. The fluorescence excitation may be controlled by various light wavelengths. Fluorescent materials may each be controlled by a different wavelength or range of wavelengths. Preferably, the fluorescent extraction surface 130,150 may be excitable by wavelengths from 200 to 500 nm, more preferably from 250 to 470 nm, and even more preferably from 300 to 460 nm. Preferably the light source 112 provides light that will provide fluorescence excitation of the light extraction surface 130,150. In some embodiments, the light path 120 reflecting through the waveguide may have a color which may be visible to an observer. Preferably, a color of the light reflecting through the waveguide may be a different color from that of a light emitted from a light extraction surface 130,150. For example, the light extraction surface 130,150 may be formed to provide a white light in response to a blue colored light wavelength excitation. Where plural light extraction surfaces 130,150 are arranged on the glazing 102,302, a single colored light source 112 may be extracted as different colors by the different light extraction surfaces 130,150.

In some embodiments, a holographic film may be used as the light extraction surface 130. A holographic film may be provided on a glazing 102,302 or laminated within a glazing 102. In particular embodiments, a holographic film may be directional such that light is directed to a desired area and may not illuminate an undesired side of the glazing 102,302. For example, it may be desirable to provide light to a vehicle interior without directing light to a vehicle exterior, or to provide light to a vehicle exterior without directing light to a vehicle interior. A light extraction surface 130,150 including a holographic film may provide such a directional lighting solution as the holographic film may include a formation for controlling the direction of light. The holographic film may be configured to direct light in a particular direction or to diffuse light in a particular way. In certain embodiments, a light extraction surface 130,150 may be structured of a volumetric holographic film. In some embodiments, the holographic film may be a surface holographic film, particularly where the light extraction surface 130,150 is on an outer glazing surface.

The light extraction surface 130,150 may, in further embodiments, be a diffusing surface. A diffusing surface may collect a light from the waveguide and diffuse the light therethrough or therefrom. A diffusing surface extraction surface 130,150 may include colorants. The diffusing surface may preferably be formed by a film. In some embodiments, the diffusing film may include particles, which may be any suitable material, such as indium tin oxide (ITO), aluminum tin oxide (ATO), titanium oxide, tungsten oxide, zirconium oxide, diamond, or colored pigments. In some embodiments, the particles are colorants, which may partially absorb light, which may provide a colored dispersed light. Organic or inorganic particles, including color pigments, may be used in embodiments disclosed herein. Such diffusing films are described in PCT Publication No. WO2017/154583, which is incorporated herein by reference.

It is shown that a light extraction surface herein may comprise a light-directing element or a light-diffusing element or material such as described above. It may be provided at a local region in communication with the light path/waveguide. It may receive light transmitted along the waveguide from one or more said introduction surfaces, typically spaced away from the light extraction surface at a different position on the layer e.g. at a periphery thereof, and diffuse or direct that light to the outside of the glazing to provide functional lighting from the glazing.

Figure 9:
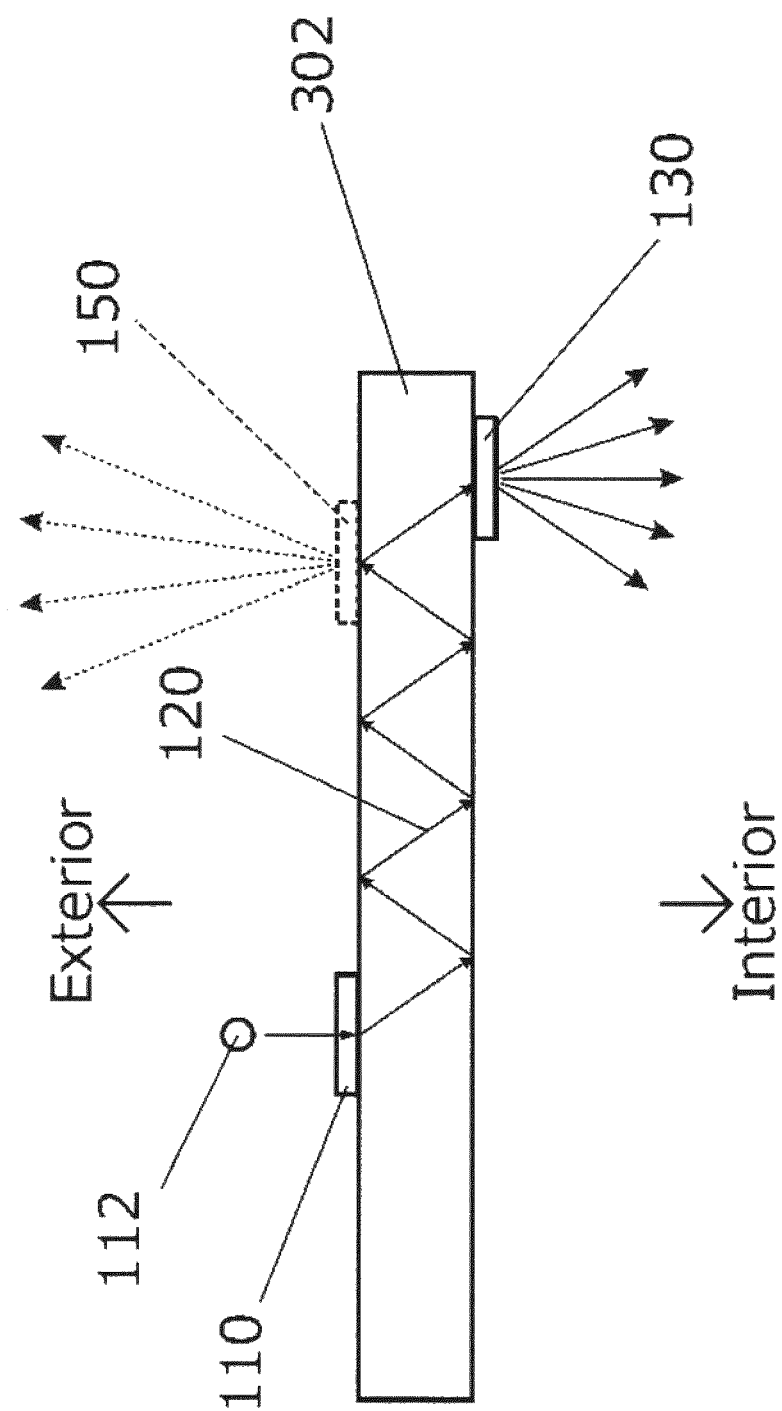
FIG. 9 illustrates a glazing having a structure with a light introduction surface on an exterior side of the glazing, according to an exemplary aspect of the present disclosure.
Figure 10:
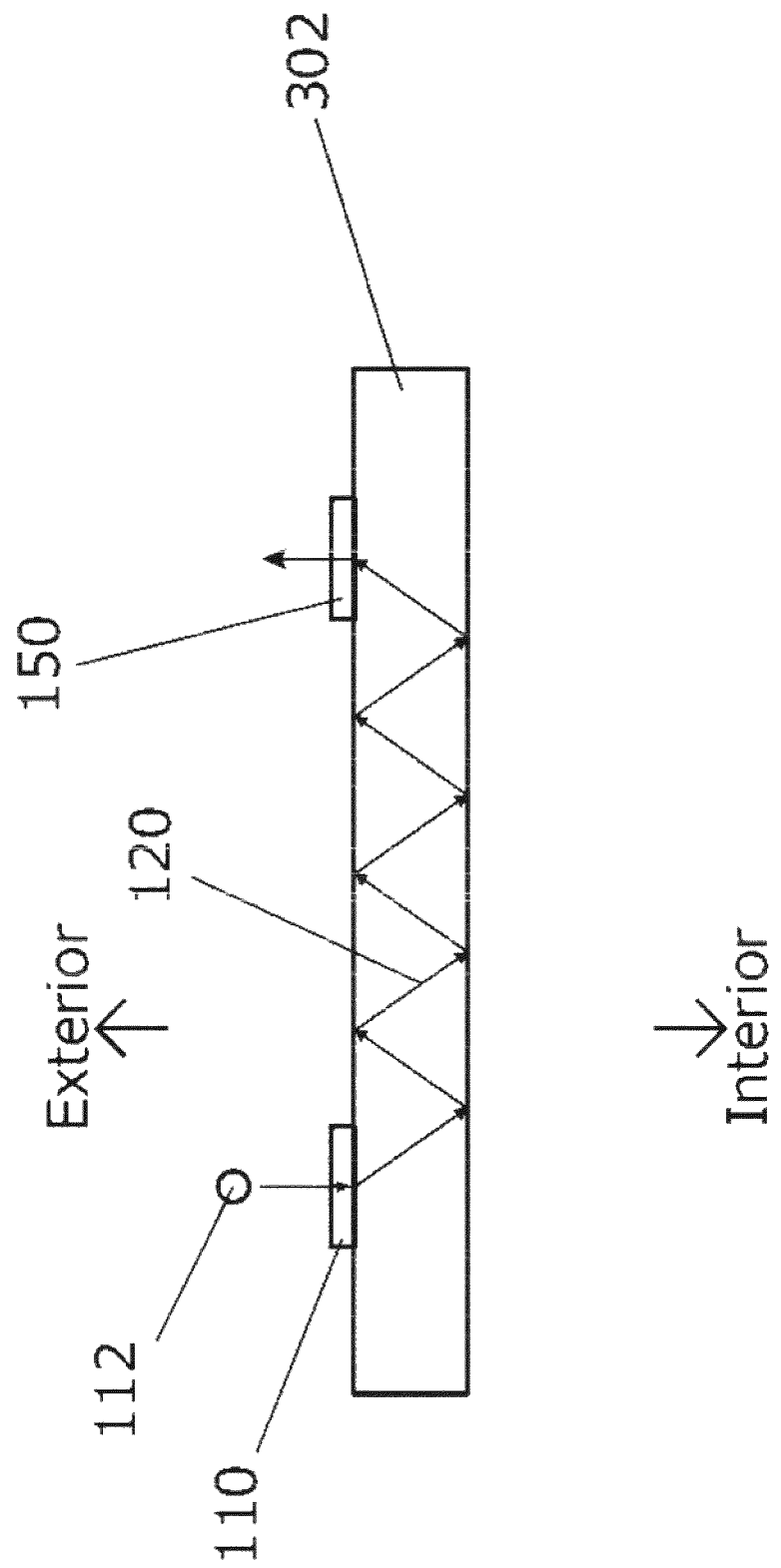
FIG. 10 illustrates a glazing having a structure with a light path formed in the glazing and a light introduction surface on an exterior side of the glazing, according to an exemplary aspect of the present disclosure.

According to embodiments disclosed herein, the light source 112 may be set up on either side of a glazing 102,302 and the light extraction surface 130,150 may provide light on either or both sides of a glazing 102,302. For example, as shown in FIG. 1, the light source 112 may be adjacent to the same surface of the glazing 102 from which light is extracted. Further embodiments, as shown in FIGS. 9, 10, may include the light source 112 on the exterior side of the glazing 302. The light extraction surface 150, 130 shown in FIG. 9 is of a diffused type whereas the light extraction surface 150 shown in FIG. 10 is of a directing type.

Figure 11:
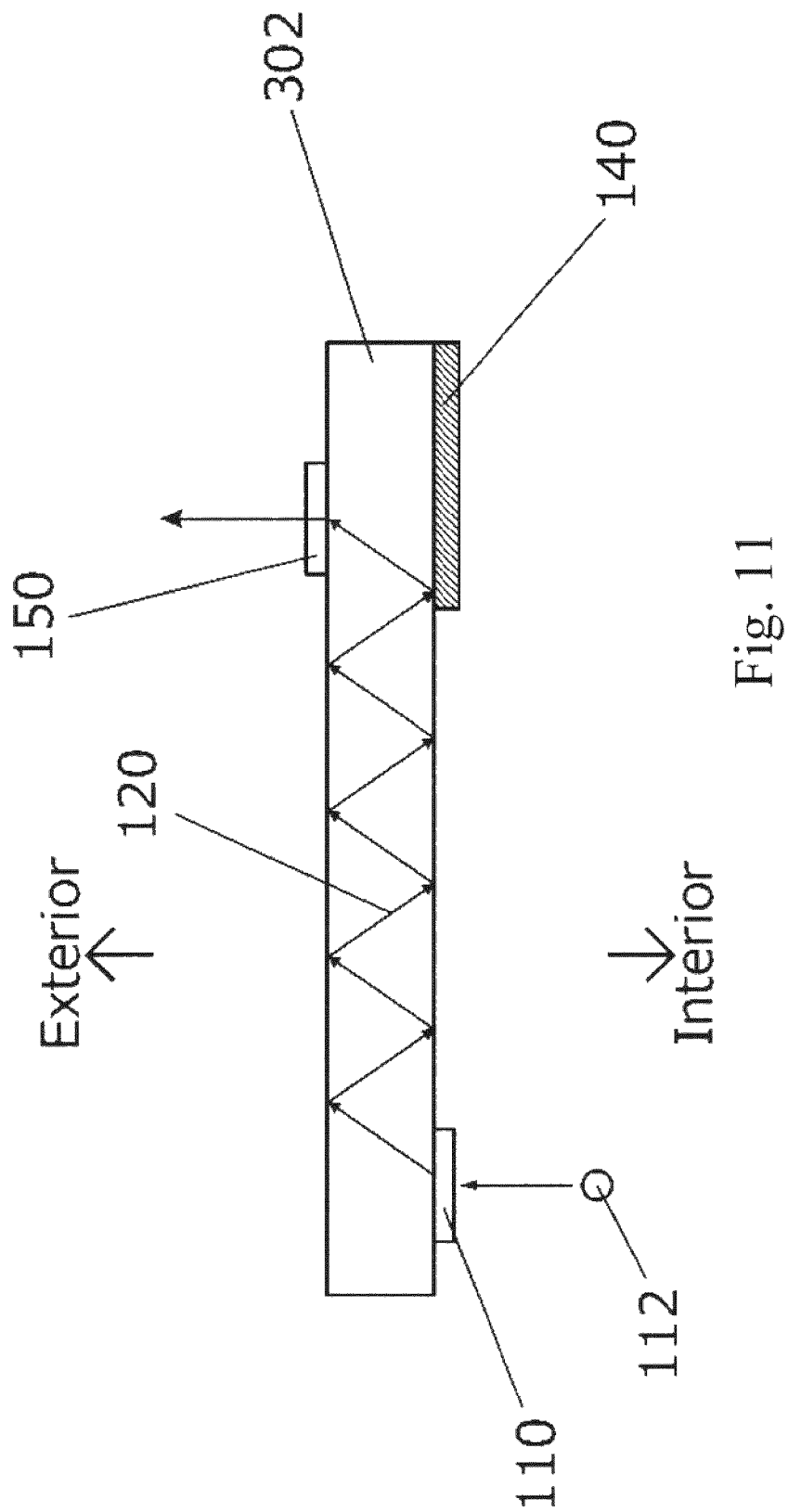
FIG. 11 illustrates a glazing having a structure with an opaque printing near a light extraction surface, according to an exemplary aspect of the present disclosure.

In some embodiments, as shown in FIG. 11, an opaque printing 140 may be provided behind a light extraction surface 150. This may be preferable to provide a dark background to improve light intensity from the extraction surface 150 or to hide the light from a vehicle interior. In some further embodiments, a glazing 102,302 may include a light extraction surface 130,150 between a vehicle interior and an opaque printing 140 on the glazing 102,302, which may provide a dark background for interior facing light extraction.

Figure 12:
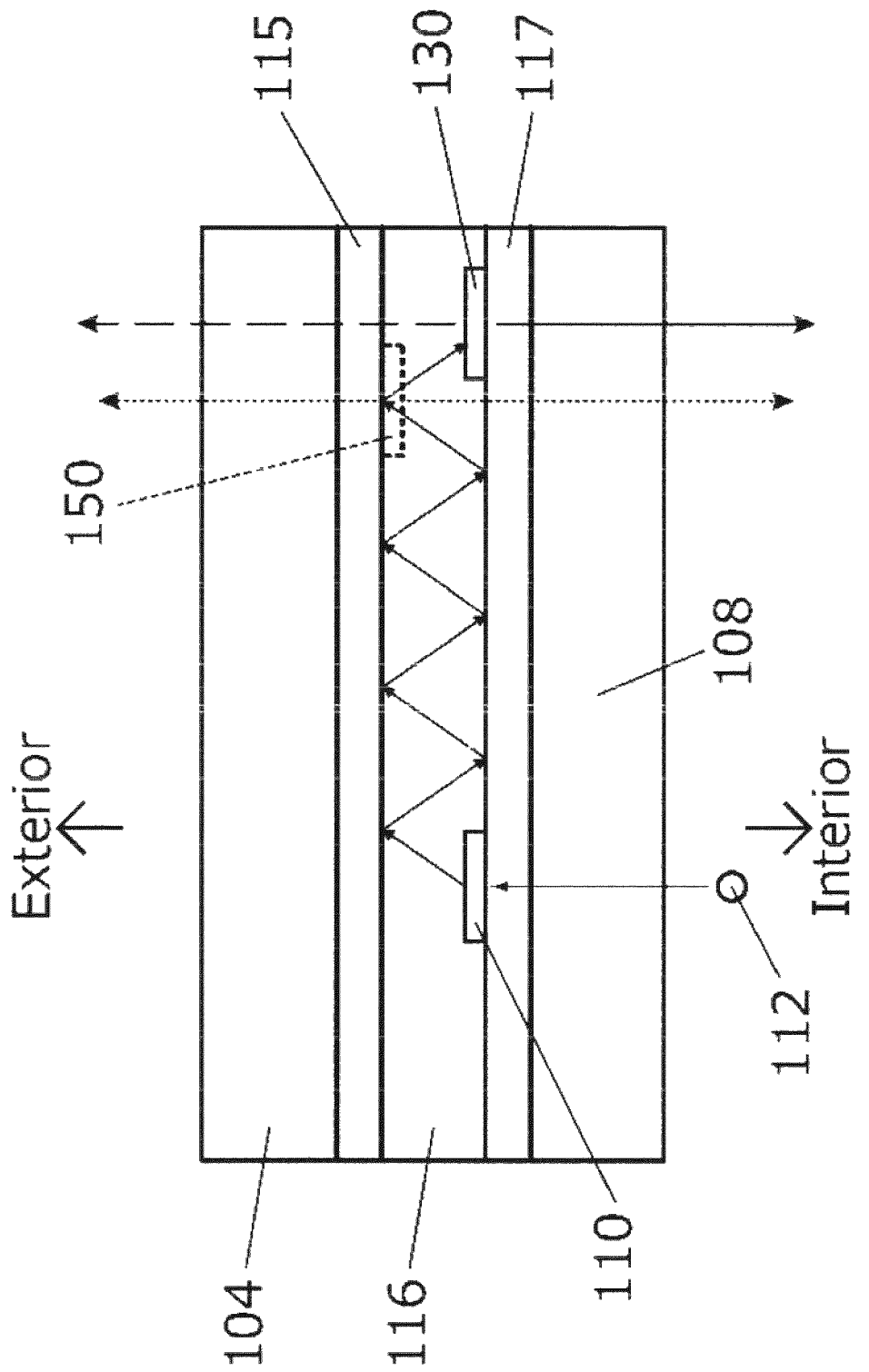
FIG. 12 illustrates a laminated glazing having a structure with a polymer interlayer having multiple layers, according to an exemplary aspect of the present disclosure.

FIG. 12 shows a glazing having a first glass substrate 104 and a second glass substrate 108, and a polymer interlayer formed with a core polymer layer 116 sandwiched by a first adhesive polymer layer 115 and a second adhesive polymer layer 117. A light introduction surface 110 may be arranged between the inner surface of the core polymer layer 116 and the second adhesive polymer layer 117. A light extraction surface 130,150 may be provided at either or both of the sides of the core polymer layer 116 to extract light from the core polymer layer 116 waveguide. A light source 112 may be provided to direct light to the light introduction surface 110. The light path from the light introduction surface 110 may be formed within a waveguide formed of the core polymer layer 116 where the light is reflected between the boundaries of the core polymer layer 116. In some embodiments, the core polymer layer 116 may be a relatively high refractive index material, such as polyethylene terephthalate (PET) (having a refractive index of 1.57 to 1.58) or polyimide (having a refractive index of about 1.64), while the adhesive polymer layers may be a relatively low refractive index material, such as PVB.

Figure 13:
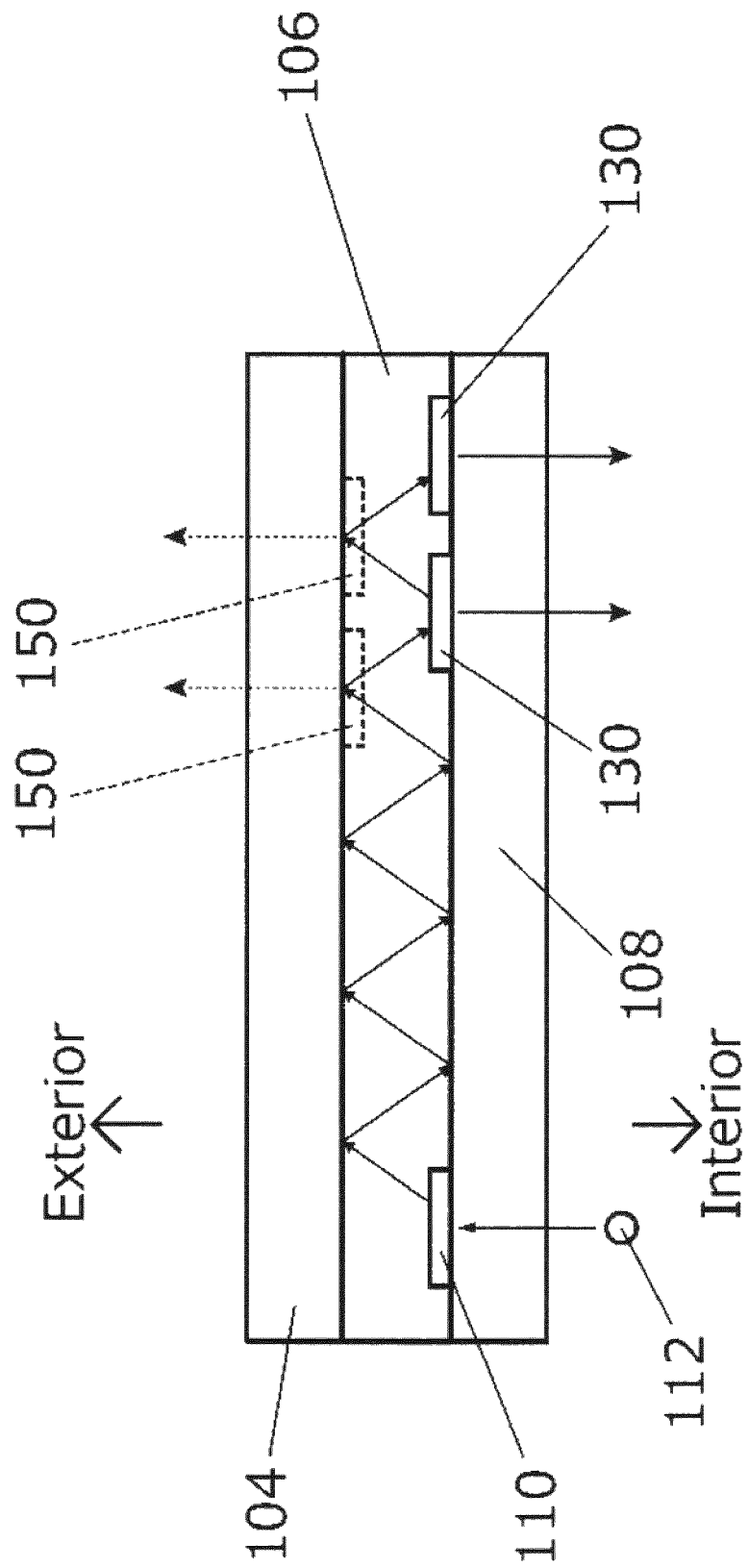
FIG. 13 illustrates a laminated glazing having a structure with multiple light extraction surfaces, according to an exemplary aspect of the present disclosure.
Figure 14:
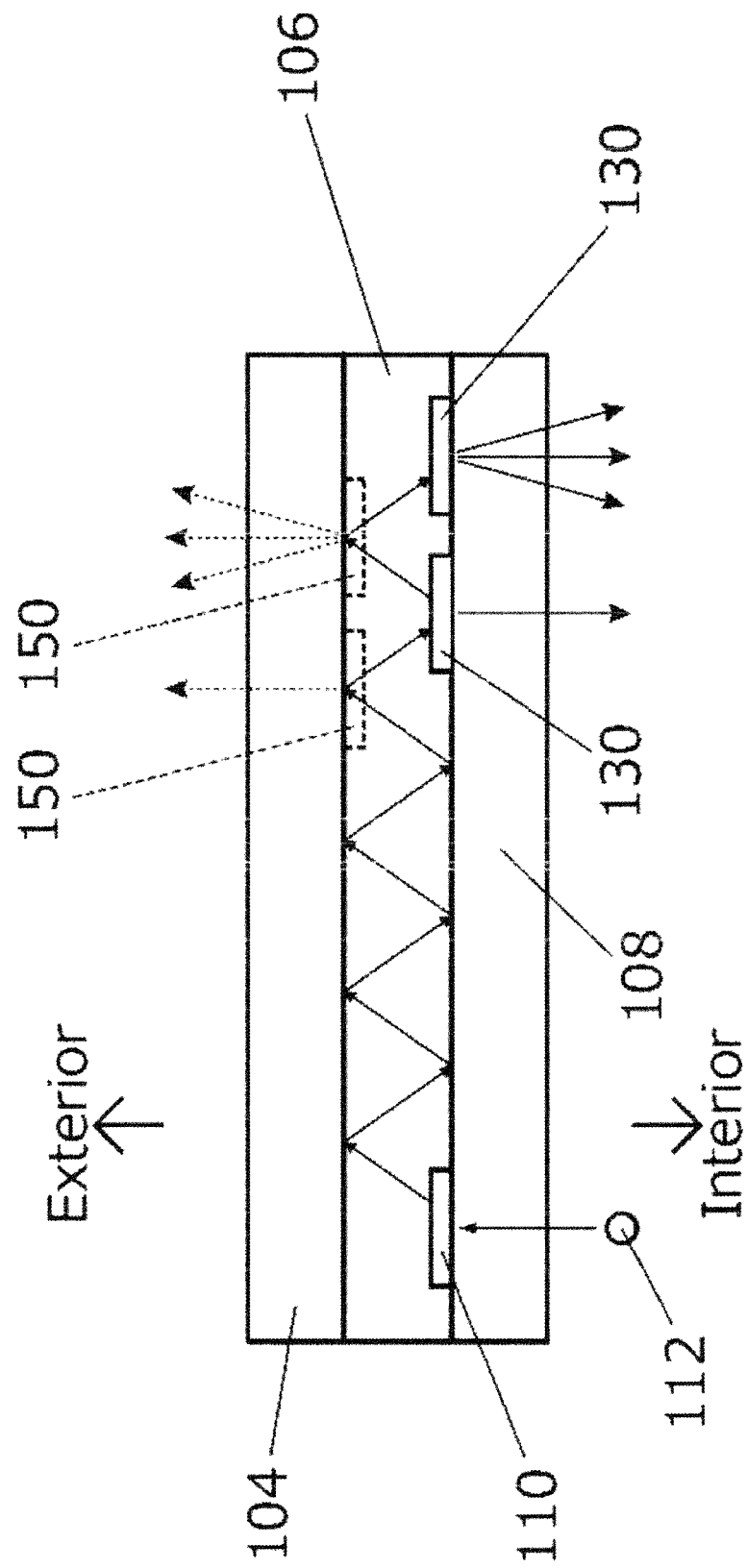
FIG. 14 illustrates a laminated glazing having another structure with multiple light extraction surfaces, according to an exemplary aspect of the present disclosure.

In further embodiments, multiple light extraction surfaces 130,150 may be provided on either one or multiple glazing surfaces as shown in FIG. 13. On one surface of the glazing, different types of light extraction surfaces may be employed as shown in FIG. 14. As shown in FIG. 14, a direct type and a diffuse type of the light extraction surfaces 130,150 may be provided on multiple surfaces of the glazing.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A laminated glazing, comprising:
a first glass substrate having a first surface and a second surface;
a second glass substrate having a third surface and a fourth surface;
a polymer interlayer laminated between the first glass substrate and the second glass substrate, contacting the second surface of the first glass substrate and the third surface of the second glass substrate;
a light path formed in any one or combination of the first and second glass substrates and the polymer interlayer for guiding light emitted from a light source;
a light introduction surface for introducing a light which is to be directed from the first surface or the fourth surface of the laminated glazing, to a waveguide; and
a light extraction surface for extracting, from the waveguide, the light to either one or both of an interior and an exterior of the first and second glass substrates,
wherein at least one of the light introduction surface and the light extraction surface is a diffusing film.

2. The laminated glazing according to claim 1, wherein the light introduction surface is separate from the light extraction surface.

3. The laminated glazing according to claim 1, wherein the light introduction surface is laminated between the first glass substrate and the second glass substrate.

4. The laminated glazing according to claim 3, wherein the light introduction surface is on the third surface of the second glass substrate.

5. The laminated glazing according to claim 1, wherein the light extraction surface is on the fourth surface of the second glass substrate.

6. The laminated glazing according claim 1, wherein the light extraction surface is laminated between the first glass substrate and the second glass substrate.

7. The laminated glazing according to claim 1, wherein the light source is adjacent to the first glass substrate or the second glass substrate and comprises an optical element between the light source and the light introduction surface.

8. The laminated glazing according to claim 7, wherein the light source comprises multiple light sources, and wherein the optical element receives light from the light sources.

9. The laminated glazing according to claim 7, wherein the optical element receives diffuse light from the light source and directs the diffuse light to the light introduction surface.

10. The laminated glazing according to claim 1, wherein a said light introduction surface and a said light extraction surface are on the third surface of the second glass substrate.

11. The laminated glazing according to claim 1, wherein a said light introduction surface and a said light extraction surface are on the fourth surface of the second glass substrate.

12. The laminated glazing according to claim 1, wherein a said light introduction surface and a said light extraction surface are on different glass substrate surfaces.

13. The laminated glazing according to claim 1, wherein the diffusing film includes particles or dyes.

14. The laminated glazing according to claim 1, wherein the waveguide is the polymer interlayer.

15. The laminated glazing according to claim 14, wherein the polymer interlayer includes a core polymer layer sandwiched by a first adhesive polymer layer and a second adhesive polymer layer.

16. The laminated glazing according to claim 1, wherein the light extraction surface comprises multiple light extraction surfaces.

17. The laminated glazing according to claim 1, wherein the polymer interlayer embeds either or both of the light introduction surface and the light extraction surface therein.

* * * * *